R. GORHAM & C. G. CARY.
MEAT SUPPORT.
APPLICATION FILED APR. 3, 1916.
1,222,390.
Patented Apr. 10, 1917.
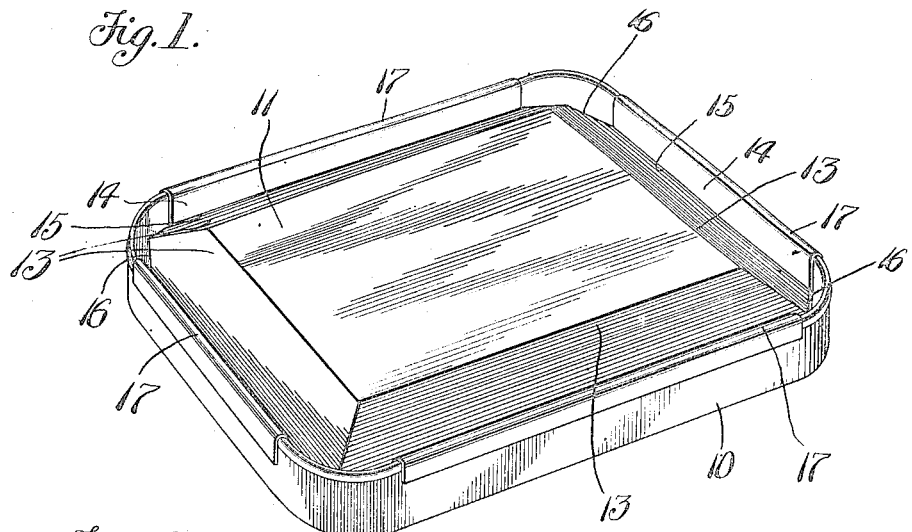
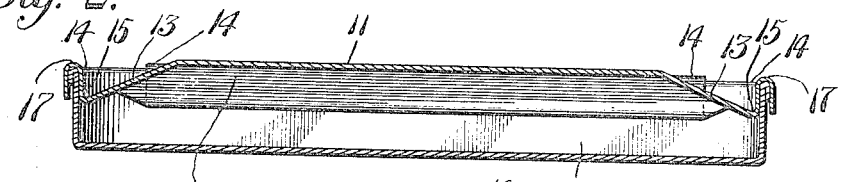
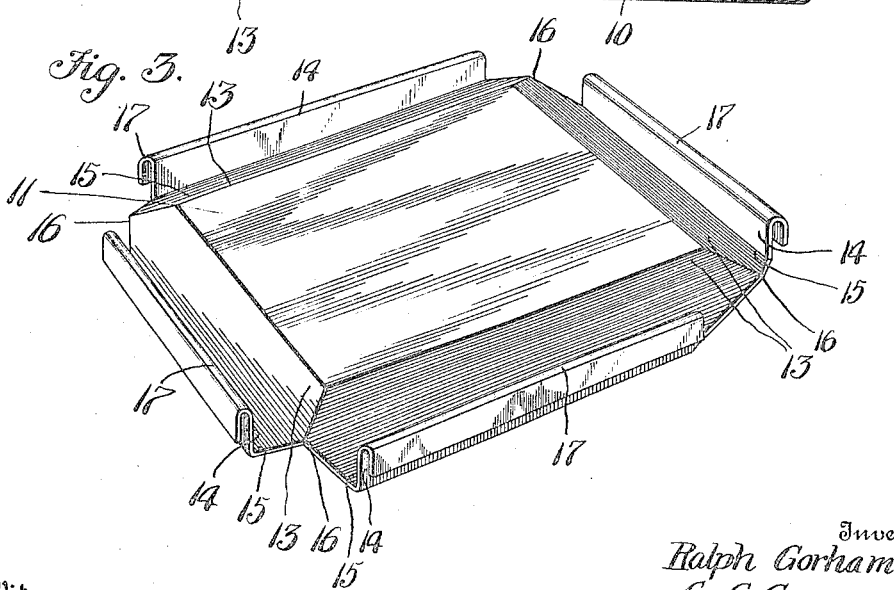
Witnesses
C. J. Maddox
Edward Frazer
Inventors
Ralph Gorham
C. G. Cary
By Victor J. Evans
Attorney

UNITED STATES PATENT OFFICE.

RALPH GORHAM, OF WINFIELD, AND CLARENCE G. CARY, OF ZEARING, IOWA.

MEAT-SUPPORT.

1,222,390.  Specification of Letters Patent.  Patented Apr. 10, 1917.

Application filed April 3, 1916. Serial No. 88,698.

*To all whom it may concern:*

Be it known that we, RALPH GORHAM, residing in Winfield, county of Henry, and State of Iowa, and CLARENCE G. CARY, residing in Zearing, county of Story, State of Iowa, citizens of the United States, have invented new and useful Improvements in Meat-Supports, of which the following is a specification.

In meat shops and like places it is customary to cut steaks and chops, and arrange the same upon a plate in superimposed relation for display purposes. The unconfined blood flowing from the meat accumulates in the plate, and in short order overflows with a result that it spreads over the shelf of the display case. This is not only objectionable from a sanitary point of view, but the lowermost slices of meat being submerged are very frequently darkened in color which prohibits the sale of the same.

It is the primary object of our invention to provide a support for the meat which will obviate the above noted objections in the present day method.

To this end the invention embodies a receptacle having a cover upon which the meat is adapted to be supported, the cover being formed to direct the unconfined blood which flows from the meat into the receptacle, the parts being constructed to permit the same to be quickly and easily cleansed when desired.

The nature and advantages of the invention will be better understood from the following description when read in connection with the accompanying drawing, the invention residing in the construction and combination of parts as claimed.

In the drawing forming part of this specification like numerals of reference indicate similar parts in the several views and wherein:—

Figure 1 is a perspective view of the device.

Fig. 2 is a transverse sectional view.

Fig. 3 is a perspective view of the cover removed.

Before entering into a detail description of what is herein shown we desire to have it understood that the same is merely illustrative of one embodiment of the invention, to which we do not limit ourselves, and that such changes in the construction and arrangement of parts may be resorted to when desired as fall within the scope of what is claimed.

Referring more particularly to the drawing in detail 10 indicates the receptacle which may be of any suitable design and dimensions, preferably of rectangular formation in cross section, and provided with rounded corners which permits of the receptacle being readily and easily cleaned, and thereby eliminating sharp corners and crevices in which impurities would collect.

The cover for the receptacle may be constructed from any suitable material, preferably the same material from which the receptacle is formed, and as shown in this particular instance is formed with a raised center 11 upon which the steaks and chops are adapted to be supported. At each side and end of the raised center the cover is inclined downwardly as at 13, the material forming the inclined portion being then bent upwardly to provide vertical walls 14 defining with the inclined portions 13 channels 15. The dimensions of the inclined portions 13 and vertical walls 14 are such that the channels 15 are disposed within the receptacle when the cover is in applied position, while the cover at each of its four corners is cut away as at 16 to establish communication between the channels 15 and the interior of the receptacle 10. While the cover may be supported upon the receptacle in any suitable manner it is desired to bend the vertical walls 14 in the manner shown to provide flanges 17 which overhang the upper edge of the receptacle.

In practice the steaks and chops are arranged in superimposed relation upon the raised center of the cover, and as the unconfined blood in the meat flows therefrom, it is directed into the channels 15 by means of the inclined portions 13, from whence it enters the receptacle 10 through the openings provided by the cut away portions 16 at the corners as shown. In this manner the meat is prevented from coming in contact with the unconfined blood which flows from the meat, and is thus preserved from the bad effects of these ingredients, coming in contact with each other as hereinabove stated. Manifestly the cover can be easily removed from the receptacle and together with the latter cleaned in short order.

What is claimed is:—

1. A meat support comprising a receptacle, a cover therefor having a raised center with channels communicating with the receptacle for directing the unconfined blood flowing from the meat upon said center into said receptacle, and flanges formed on one wall of each channel to overlie the upper edge of the receptacle for holding the members associated.

2. A meat support comprising a receptacle, a cover therefor having a raised center and downwardly inclined edge portions, a wall rising from the lower extremity of each inclined edge portion and defining with the latter a channel, and said walls terminating short of the side and ends of the cover to provide openings at the corners of the latter for directing the unconfined blood flowing from the meat from the channels into the receptacle, and means for supporting the cover on the receptacle.

In testimony whereof we have affixed our signatures in the presence of two witnesses.

RALPH GORHAM.
CLARENCE G. CARY.

Signatures witnessed to by—
E. M. HEDGES,
J. S. SMITH.